United States Patent [19]
Tezuka

[11] 3,982,731
[45] Sept. 28, 1976

[54] FLUID PRESSURE ROLLER JACK

[75] Inventor: Toshiyata Tezuka, Yokohama, Japan

[73] Assignee: Bridgestone Tire Company Limited, Tokyo, Japan

[22] Filed: Mar. 31, 1975

[21] Appl. No.: 563,899

Related U.S. Application Data

[63] Continuation of Ser. No. 381,198, July 20, 1973, abandoned.

[30] Foreign Application Priority Data

July 24, 1972 Japan............................ 47-73931

[52] U.S. Cl. ........................................... 254/93 HP
[51] Int. Cl.² ........................................... B66F 3/24
[58] Field of Search .............. 254/93 HP; 92/34, 35; 29/454

[56] References Cited
UNITED STATES PATENTS

| | | | |
|---|---|---|---|
| 2,714,011 | 7/1955 | Albee | 254/93 HP |
| 3,026,541 | 3/1962 | Murat | 254/93 HP |
| 3,324,917 | 6/1967 | Schirtzinger | 29/454 |
| 3,565,398 | 2/1971 | Floria | 254/93 HP |

FOREIGN PATENTS OR APPLICATIONS 813,235  5/1959  United Kingdom ............ 254/93 HP

*Primary Examiner*—Al Lawrence Smith
*Assistant Examiner*—Robert C. Watson
*Attorney, Agent, or Firm*—Sughrue, Rothwell, Mion, Zinn and Macpeak

[57] ABSTRACT

A fluid pressure roller jack consisting of a flexible inflatable and collapsible fluid-tight bag which is formed with inherent fold lines such that the bag is invariably folded along the fold lines adapted to be kept folded while it is being collapsed. In a collapsed position the roller jack is rectangular in configuration in a plane having cut off its corners, while in a fully inflated position the roller jack is a sausage-like body in the form of a cylinder having hemispherical ends. The several fluid pressure roller jacks serve to lift a heavy article as jacks by an inflation from collapsed position to inflated position and to transport the heavy article supported on the roller jacks as rollers.

2 Claims, 16 Drawing Figures

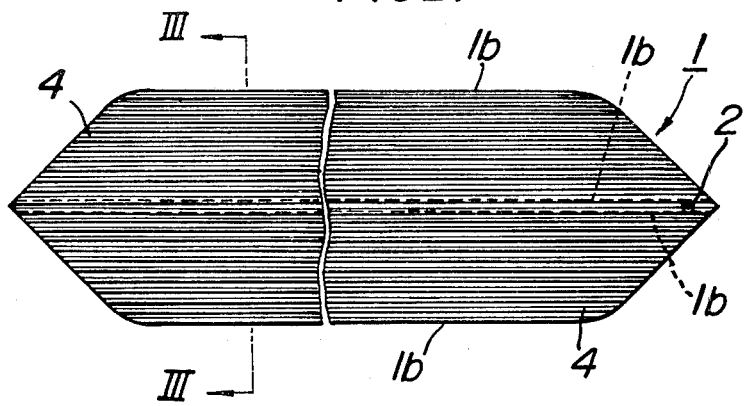
FIG_1
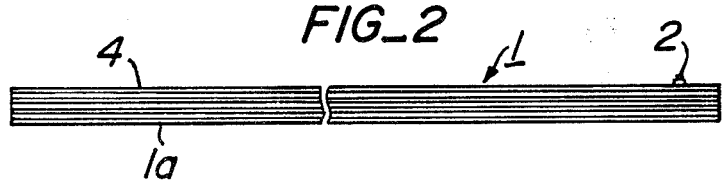
FIG_2
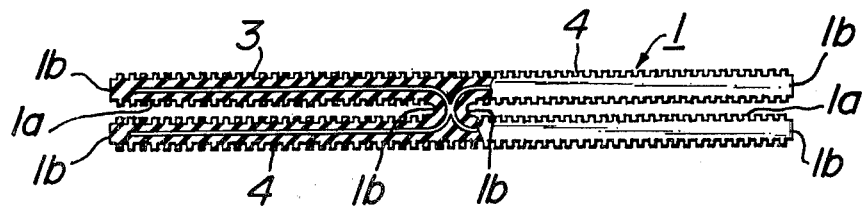
FIG_3
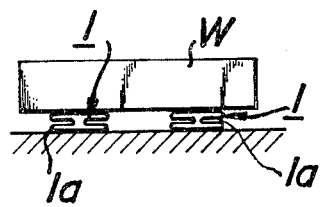
FIG_4
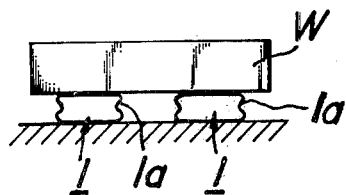
FIG_5

FIG_6
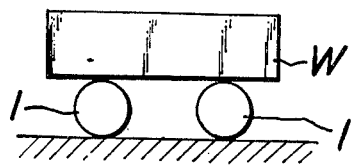
FIG_7  FIG_8
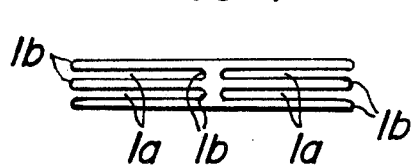 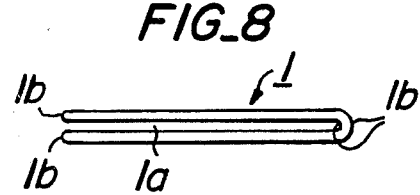
FIG_9A
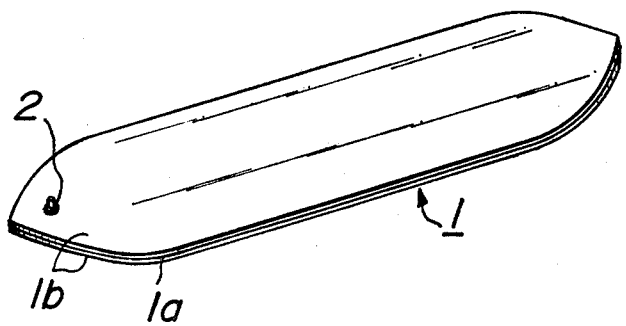
FIG_9B
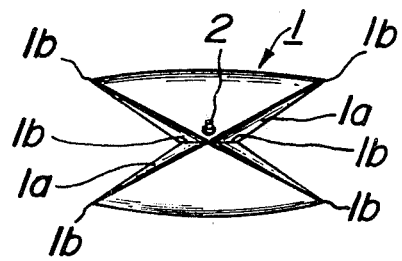

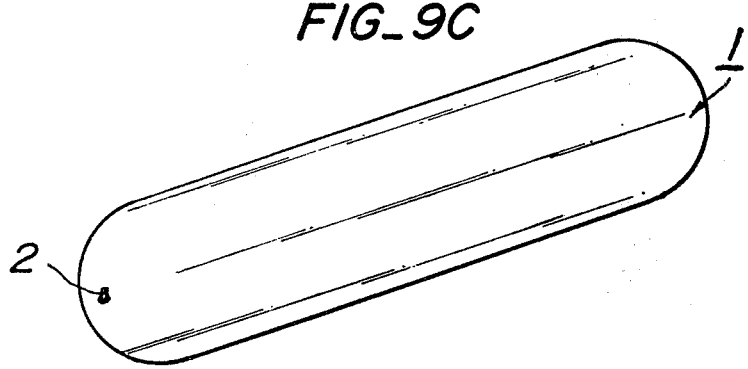
FIG_9C
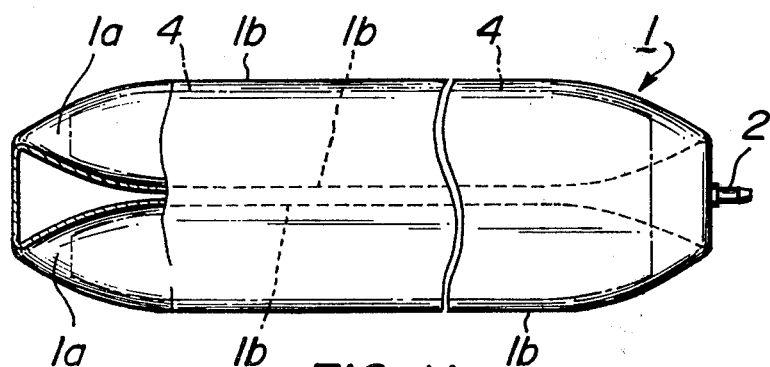
FIG_10
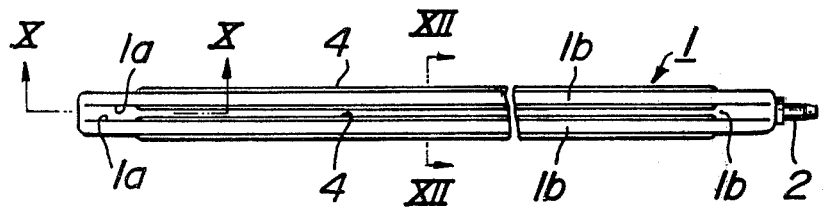
FIG_11

FIG._12
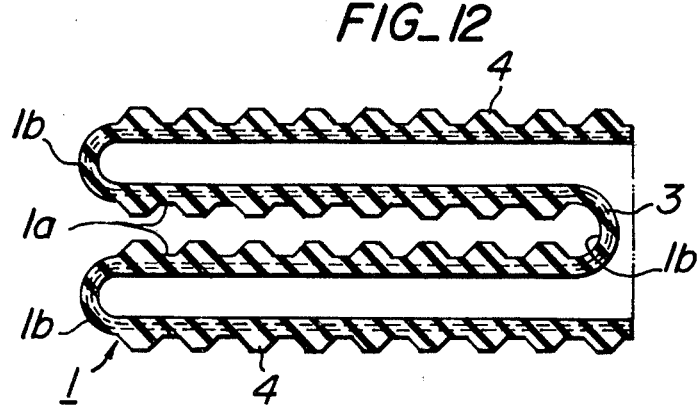
FIG._13A
PRIOR ART
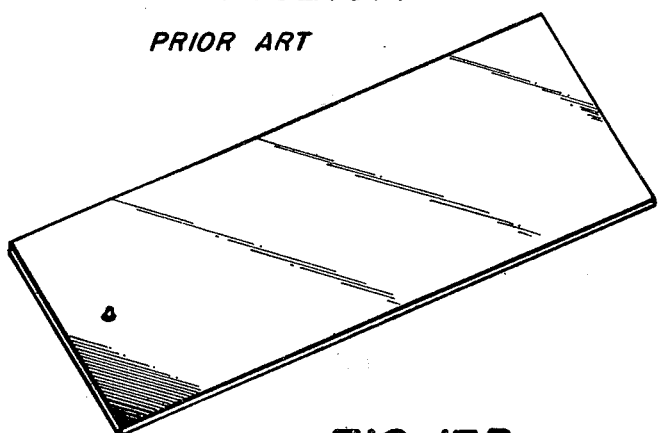
FIG._13B
PRIOR ART
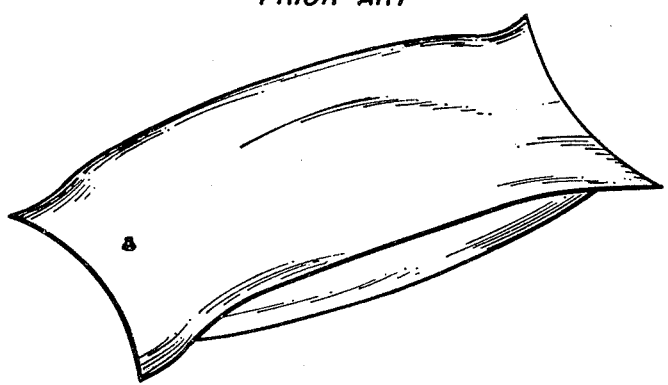

FLUID PRESSURE ROLLER JACK

This is a continuation, of application Ser. No. 381,198, filed July 20, 1973 now abandoned.

BACKGROUND OF THE INVENTION

1. Field of the Invention

The present invention relates to a fluid pressure roller jack consisting of an inflatable and collapsible bag adapted to be used as a roller or a jack for lifting heavy weights such as derailed vehicles.

It will be understood that the expression "fluid" used herein will include not only liquid but also gas, though water is primarily used as the fluid to be filled in the roller jack.

2. Description of the Prior Art

Such a kind of fluid pressure roller jack has been used which consists of a rubber bag of a rectangle configuration in its collapsed position, the rubber bag being merely provided with a valve for fluid under pressure getting in and out of the bag therethrough. There are several disadvantages with such a construction. In particular, the bag, particularly a large bag in size, occupies a great space in a plane in its collapsed position despite the fact that the fluid under pressure therein has been completely evacuated, which is troublesome in handling. Also there is a tendency for such bags to be damaged in use, and an article supported on such bags is likely to slip thereon that is, the article is normally supported in unstable condition. Moreover, when the inflated bags are used as rollers, corners extending beyond the ends of the rollers interfere with the rolling of the rollers themselves.

OBJECTS OF THE INVENTION

A primary object of the invention is, therefore, to provide a novel and improved fluid pressure roller jack which eliminates the above disadvantages in the prior art.

Another object of the invention is to provide an improved fluid pressure roller jack which is very small in size in collapsed position, which provides a greater ease in arranging the jacks under a heavy article to be shifted and in transporting and storing the roller jacks in a storehouse.

A still further object of the invention is to provide an improved fluid pressure roller jack adapted to be smoothly inflated from the collapsed position without being subjected to undue stresses on itself notwithstanding it has been collapsed in small size.

A still further object of the invention is to provide an improved fluid pressure roller jack in which the bag is provided with inherent fold lines so that it comes into a predetermined collapsed position of itself due only to the discharge of the fluid in the bag, thereby providing a greater ease in operation.

Another object of the invention is to provide an improved fluid pressure roller jack in which the bag is formed on the surfaces with a number of protuberances or serrations which serve to increase the friction both between an article being carried and the surfaces of the bag and between a floor over which an article is being carried and the surfaces of the bag, thereby improving the stability of the article and preventing damage to the bag.

A still further object of the invention is to provide an improved fluid pressure roller jack adapted to be in a cylindrical shape having hemispherical ends in an inflated position so that, when the bag is being used as a roller, it rolls on the floor with greater ease.

SUMMARY OF THE INVENTION

For the accomplishment of the foregoing objects, in one aspect of the invention, an inflatable and collapsible fluid-tight bag is provided with parts adapted to be folded inwardly when it is being collapsed. If desired, the bag is formed with inherent fold lines such that the bag is invariably folded along fold lines which are kept folded while it is being collapsed. Furthermore, the bag may be formed on its surfaces with a number of protuberances for preventing slippage, and the collapsed bag may have the shape of a rectangle the corners of which have been cut off.

In another aspect of the invention, an inflatable and collapsible fluid-tight bag is provided with parts adapted to be folded inwardly in its longitudinal direction at two positions in opposition to each other. The folded parts are folded inwardly in the collapsed position, the collapsed bag has the shape of a rectangle the corners of which are cut off, and the folded parts have the shapes of double-ended boats when viewed in a plane.

The invention will be more fully understood by referring to the following detailed specification and claims taken in connection with the appended drawings.

BRIEF DESCRIPTION OF THE DRAWINGS

FIG. 1 is a plan view of a fluid pressure roller jack according to the invention;

FIG. 2 is an end view of the roller jack shown in FIG. 1;

FIG. 3 is an enlarged sectional view taken along line III—III in FIG. 1;

FIG. 4 is a diagrammatical view showing a heavy article and the roller jacks arranged under the article in collapsed position;

FIG. 5 is a diagrammatical view showing an intermediate position of the roller jacks which are being inflated;

FIG. 6 is a diagrammatical view showing the heavy article supported by the fully inflated roller jacks;

FIG. 7 is a diagrammatical sectional view showing a collapsed position of another embodiment of the roller jack according to the invention;

FIG. 8 is a diagrammatical sectional view showing a collapsed position of still another embodiment of the roller jack according to the invention;

FIG. 9A is a perspective view showing a collapsed position of the roller jack according to the invention;

FIG. 9B is a front elevation showing a half inflated position of the roller jack shown in FIG. 9A;

FIG. 9C is a perspective view illustrating a fully inflated position of the roller jack shown in FIG. 9A;

FIG. 10 is a plan view of another embodiment of the roller jack according to the invention, partly in section taken along the line X—X in FIG. 11;

FIG. 11 is an end view of the roller jack shown in FIG. 10;

FIG. 12 is a partial sectional view of the roller jack taken along the line XII—XII in FIG. 11;

FIG. 13A is a perspective view illustrating a collapsed position of a fluid pressure roller jack in the prior art; and FIG. 13B is a perspective view showing an inflated position of the roller jack in the prior art shown in FIG. 13A.

DESCRIPTION OF THE PREFERRED EMBODIMENTS

Referring to FIGS. 1–3, there is shown a fluid-tight bag 1 having a valve 2 through which a fluid such as water under pressure can get in and out of the bag 1. The bag 1 is made of a flexible material such as rubber or the like so as to be inflatable or expansible and collapsible or contractible, but a layer of a flexible tough reinforcement 3 of a material such as laminated canvas is preferably included in order to strengthen the bag. The bag 1 may be made in any configuration so long as the inflated bag filled with fluid under pressure is circular in cross-section, thereby forming a roller as a whole.

As can be seen in FIG. 3, the bag 1 is adapted to be collapsed into a flat plate-like body in its fully collapsed position, in which portions 1a are folded inwardly toward each other. In the collapsed position, both sides of the bag may be folded or doubled over on themselves (FIG. 3), the sides of the box may be folded into multiple layers (FIG. 7), or the bag may be doubled over on itself (FIG. 8).

In order to facilitate the folding operation, the bag is formed with inherent fold lines 1b as it is made such that the bag is invariably folded along the same fold lines, which are kept folded while the bag is being collapsed. In the case of a bag made of rubber, the inherent fold lines may be formed when it is cured.

In an important aspect of the invention, the bag is formed on its surfaces with a number of fine protuberances or serrations 4 which are adapted to contact both a heavy article being lifted and the surface on which the bag is arranged to prevent slippage of both the article and the bag. In FIGS. 1–3, the bag is formed all over the surfaces with a number of protuberances or serrations 4 formed integrally with the bag material in its longitudinal direction. The protuberances are not necessarily formed all over the surfaces of the bag, but may be formed in desired regions on the surfaces, as the case may be. The shape of the protuberances is not restricted to that shown in the drawings, but may be in any configuration. As an alternative, a number of metal strips may be secured to the surfaces of the bag to form the slip preventing means.

The bags shown in FIGS. 1 and 9A are in flat collapsed positions with the folded portions 1a inwardly enclosed, the bag 1 then being in the form of rectangle the corners of which are cut off. This shape is the most preferable and most distinguishable over the prior art as shown in FIGS. 13A and 13B, because, when the bags shown in FIGS. 1 and 9A have been fully inflated (FIG. 9C) from the half inflated position (FIG. 9B), the bags will be shaped into a roller-like body having hemispherical ends without protruding corners as shown in FIG. 9C.

The operation of the fluid pressure roller jack according to the invention will be described referring to FIGS. 4–6. A desired number of bags are first arranged in collapsed position under a heavy article W (FIG. 4). A fluid under pressure is then fed into the bags from a pressure fluid source such as a pump (not shown) through the valve 2 on each bag, causing the inwardly folded portions 1a of the bags to extrude outwardly in succession (FIG. 5) until the bags are fully inflated into roller bodies with the heavy article W lifted to a height corresponding to the diameter of the fully expanded bags (FIG. 6). For the purpose of the transporting the article W in the horizontal direction, it is only required to push the article in that direction with the aid of the inflated bags rolling on the ground.

Another embodiment of the jack according to the invention is shown in FIGS. 10–12, wherein opposite sides of a bag are folded inwardly in the collapsed position to form folded portions 1a which are in the form of a boat surrounded by the fold lines 1b. With such a configuration, the bag is shaped into a substantially complete sausage-like jack in the form of a cylinder having hemispherical ends when inflated. This construction ensures that the bag does not crease at the hemispherical ends where there would otherwise be a tendency to become creased in the prior art, thereby making it easy for the jacks to be rolled as rollers and minimizing any stress concentration due to crease, which results in a prolongation of the lifetime of the jack. In the embodiment shown in FIG. 10, the bag is formed in the area on the surfaces of the bag shown in chain-lines with protuberances 4 formed integrally therewith in the longitudinal direction. The shape of the protuberances 4 is trapezoidal in section as shown in FIG. 12.

As can be seen from the above description, the fluid pressure roller jack according to the invention is formed as a bag 1 of which parts are folded inwardly in a collapsed position so that the outline of the bag is very small in size, which provides a greater ease in arranging the jacks under a heavy article to be shifted and in transporting and storing the roller jacks in a storehouse. The jack according to the invention can be smoothly inflated from the collapsed position without being subjected to undue stresses on itself notwithstanding the fact that it has been collapsed to a small size. With the bag having inherent fold lines 1b, it will come into collapsed position by itself due only to discharge of the fluid in the bag, which also provides a greater ease in operation. The protuberances or serrations 4 formed on the surfaces of the bag 1 serve to increase the friction both between the article W and the surfaces of the bag and between the floor and the surfaces of the bag, thereby improving the stability of the article W and preventing damage to the bag. With the bag in its collapsed position being in the shape of a rectangle having its four corners cut off, the bag comes into a cylindrical shape having hemispherical ends in an inflated position so that when being used as a roller it rolls on the floor with ease.

While several examples have been herein disclosed, it is obvious that various changes can be made without departing from the spirit and scope of the invention as set forth in the appended claims. Further, it is to be understood that all matter hereinbefore set forth is to be interpreted as illustrative and not in a limiting sense.

What is claimed is:

1. A fluid pressure roller jack comprising a fluid-tight wall, said roller jack being:
   a. inflatable for use into a state in which said wall is generally circular in cross-section perpendicular to a principal, or cylinder, axis and the radius of the circular cross-section is approximately constant over substantially the entire length of said roller jack and
   b. collapsible for storage into a layered but generally planar state, said roller jack when collapsed for storage comprising:

c. a first layer
  i. which is hollow,
  ii. which is generally rectangular in planar view, but has rounded corners,
  iii. which is generally rectangular in cross-section, and
  iv. the hollow interior of which communicates with the hollow interior of an axial neck to be recited along the axial length of one side thereof;
d. a second layer
  i. which is hollow,
  ii. which is generally rectangular in planar view, but has rounded corners,
  iii. which is generally rectangular in cross-section,
  iv. which is substantially the same size as said first layer, and
  v. the hollow interior of which communicates with the hollow interior of said axial neck along the axial length of one side thereof; and
e. an axial neck comprising two portions of said wall
  i. which are generally perpendicular to said first and second layers,
  ii. which are generally parallel to said principal axis,
  iii. the height of which perpendicular to said first and second layers is very small relative to the width of said first and second layers, and
  iv. which together define a hollow interior which communicates with the hollow interiors of said first and second layers, said wall having inherent fold lines along which it invariably folds in a predetermined manner perpendicular to said principal axis when being collapsed, said inherent fold lines defining portions of said wall which are folded inwardly when said roller jack is in its planar state, said inherent fold lines comprising:

f. a first inherent fold line which defines the left-hand edge of said first layer,
g. a second inherent fold line which defines the right-hand edge of said first layer,
h. a third inherent fold line which defines the left-hand edge of said second layer,
i. a fourth inherent fold line which defines the right-hand edge of said second layer,
j. a fifth inherent fold line which defines the left-hand edge of said neck, and
k. a sixth inherent fold line which defines the right-hand edge of said neck, said first through sixth inherent fold lines all being of substantially the same length.

2. A fluid pressure roller jack as recited in claim 1 wherein the ends of said roller jack are generally planar and perpendicular to said principal axis.

* * * * *